No. 797,603. PATENTED AUG. 22, 1905.
M. M. PATE & H. L. ELLISON.
PLOW ATTACHMENT.
APPLICATION FILED AUG. 5, 1904.

2 SHEETS—SHEET 1.

Witnesses
Wm. J. Koerth
Ele. Blakistone

Inventors
Miles M. Pate,
Harrison L. Ellison,
By Victor J. Evans
Attorney

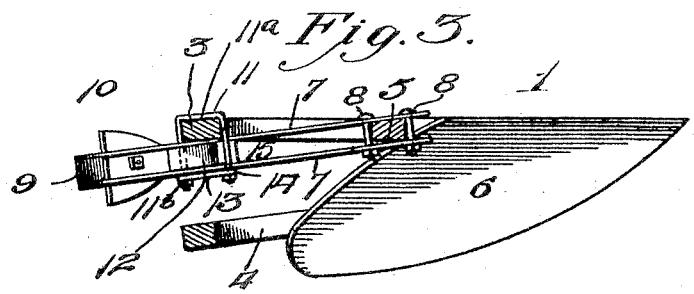
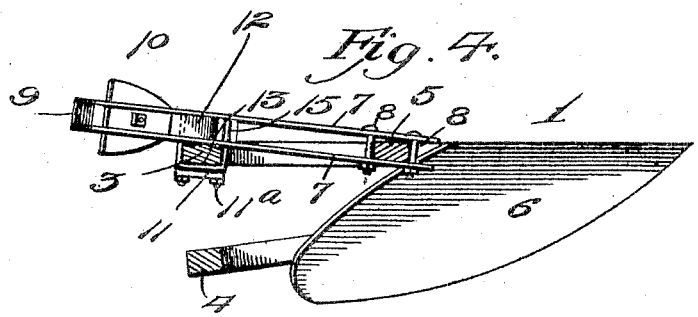
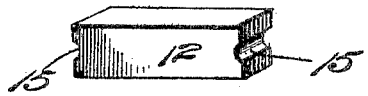

UNITED STATES PATENT OFFICE.

MILES M. PATE AND HARRISON L. ELLISON, OF MOUNT PLEASANT, TEXAS.

PLOW ATTACHMENT.

No. 797,603.        Specification of Letters Patent.        Patented Aug. 22, 1905.

Application filed August 5, 1904. Serial No. 219,681.

*To all whom it may concern:*

Be it known that we, MILES M. PATE and HARRISON L. ELLISON, citizens of the United States, residing at Mount Pleasant, in the county of Titus and State of Texas, have invented new and useful Improvements in Plow Attachments, of which the following is a specification.

This invention relates to an attachment for plows by means of which various operations can be performed which heretofore have required two or more implements to produce the same result.

The object of the invention is to provide a simple, cheap, and easily-adjusted attachment to be secured to a plow below the beam and adapted to be moved relatively to one of the handles and open the ground in rear of the moldboard for cultivating young plants, trenching the furrow when listing land, and subsoiling when breaking ground.

Figure 1:
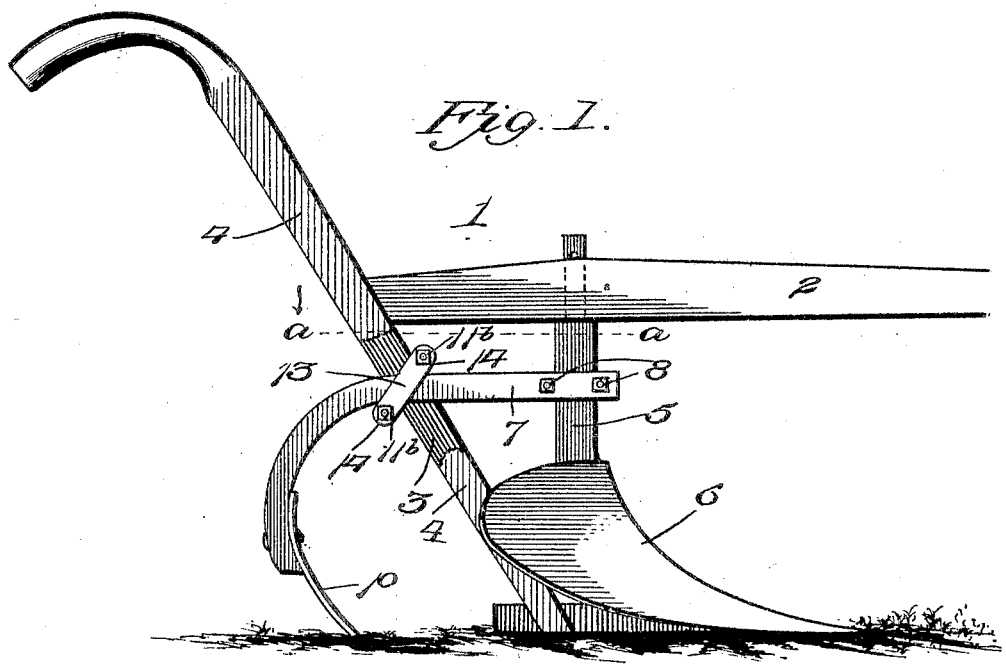
Figure 2:
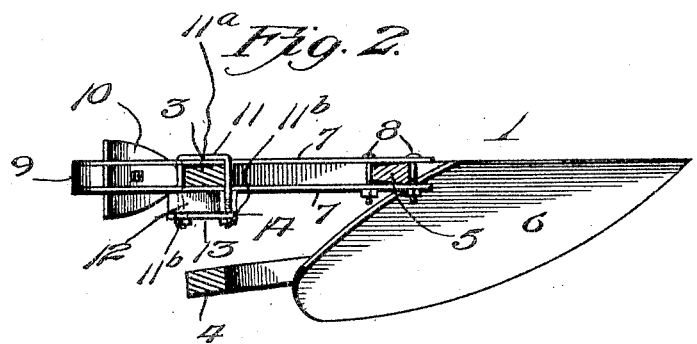

In the accompanying drawings, forming part of this specification, Figure 1 is a view in side elevation of a plow with our attachment applied thereto, one of the handles being broken away to show the attachment fastened to the other handle. Figs. 2, 3, and 4 are horizontal sectional views on the line $a\,a$ of Fig. 1, showing the attachment in different positions for performing the several functions to which our invention is applicable. Fig. 5 is a perspective view of the separating-block.

Similar reference-numerals indicate corresponding parts in different figures of the drawings.

The numeral 1 indicates a plow of ordinary form having a beam 2, handles 3 and 4, a standard 5, projecting downwardly from the beam, and a moldboard 6, attached to the standard 5. Below the plow-beam 2 are two parallel bars 7, which are detachably secured to the standard 5 by nutted bolts 8 and extend rearwardly in a substantially straight line for a suitable distance and then curved downwardly to a point near the ground. Between the lower ends of the bars 7 is secured a separating-piece 9 for holding the bars at a proper distance apart and to which a cultivator-tooth 10 or other means for working land is fastened.

The numeral 11 indicates a yoke-bolt for securing the bars 7 to the handle 3, having a straight portion $11^a$ and parallel arms $11^b$ at right angles thereto, their ends being threaded for nuts 14.

A spacing-block 12, notched at its ends 15 (see Fig. 5) to fit around the arms $11^b$ of the bolt 11, is in one position of the attachment placed between the parallel bars 7 to prevent them from being bent or distorted when the nuts 14 are turned to draw up a fastened plate 13 against one of the bars when the attachment is applied to one side or the other of the handle 3. When the bars straddle the handle 3, the spacing-block 12 lies between one of the bars 7 and the fastening-plate 13, it being thus placed to prevent bending of the fastening-plate 13 and also to fill the space between said fastening-plate and the bar, thus avoiding the necessity of cutting long threads on the yoke-bolt.

In the use of this invention when the parallel bars 7 straddle the handle 3, as illustrated by Fig. 2, the shovel 10 will be in position to side up young plants while bearing off the same. When it is desired to "burst out" or form a trench in the furrow formed while listing land, the bolt 8, which holds the bars 7 to the standard 5, and the yoke-bolts 11 are removed and the attachment placed on the left or land side of the handle 3. The bolts 8 are then replaced to fasten the forward ends of the parallel bars to the standard. In this position the spacing-block 12 is placed between the parallel bars 7. The yoke-bolt 11 straddles the handle 3 and the parallel bars 7, its arms $11^b$ resting in the notches 15 of the spacing-block 12. The fastening-plate 13 is then placed on the yoke-bolt 11 and the whole secured to the handle by the nuts 14. The attachment is then placed upon the opposite or furrow side of the handle 3 when it is desired to subsoil newly-broken land, the change of position being made in the manner hereinabove described.

It is apparent that instead of the cultivating-shovel 10 a small moldboard, either single or double, may be substituted. A double moldboard may also be used instead of the single moldboard 6. These parts being well known in the art it is not deemed necessary to illustrate them. The attachment may be raised or lowered on the standard 5 and the handle 3, as circumstances require, the adjustment depending on the use to which the attachment is put. As shown clearly in Fig. 2, the sides of the standard 5 are inclined or converged rearwardly to permit the bars 7 to properly assume an angular position relative thereto for adjustment to lie on either side of the handle 3.

Having thus described the invention, what is claimed as new, and desired to be secured by Letters Patent, is—

The combination with a plow having a supporting-standard and a controlling-handle in rear thereof, of an attachment comprising spaced parallel bars straddling the standard at their forward ends and having their rear ends extending past the handle and downwardly curved and carrying a land-working device, means for fastening the forward ends of the bars to the standard, said fastening means being adapted to permit the bars to extend in the plane of the standard and straddle the handle or to be positioned in inclined relation thereto to lie on either side of the handle, a U-shaped shackle for securing the bars to the handle in any of their adjusted positions, said shackle having threaded ends and being of a length to embrace both the handle and bars when the latter are disposed on either side thereof, a clamping-plate upon the threaded ends of the shackle, nuts engaging the threaded ends of the shackle and confining the clamping-plate thereon, and a spacing-block notched to engage the arms of the shackle, said block being adapted to be fitted on the shackle between the arms of the attachment or between one of said arms and the clamping-plate, whereby the block may be rendered inoperative or operative at will as a spacing medium to compensate for the described variations as to position of the arms, substantially as described.

In testimony whereof we affix our signatures in presence of two witnesses.

MILES M. PATE.
HARRISON L. ELLISON.

Witnesses:
F. W. FITZPATRICK,
L. E. KEENEY.